(12) United States Patent
Zheng et al.

(10) Patent No.: US 10,646,816 B2
(45) Date of Patent: May 12, 2020

(54) CORE-IN-SHELL COMPOSITE ADSORBENT FOR USE IN PSA PREPURIFIERS

(71) Applicants: Jian Zheng, Williamsville, NY (US); Neil A. Stephenson, East Amherst, NY (US); Steven J. Pontonio, Eden, NY (US); Christopher D. Schotz, Sanborn, NY (US); Philip A. Barrett, Tonawanda, NY (US)

(72) Inventors: Jian Zheng, Williamsville, NY (US); Neil A. Stephenson, East Amherst, NY (US); Steven J. Pontonio, Eden, NY (US); Christopher D. Schotz, Sanborn, NY (US); Philip A. Barrett, Tonawanda, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 51 days.

(21) Appl. No.: 15/852,042

(22) Filed: Dec. 22, 2017

(65) Prior Publication Data
US 2018/0178158 A1 Jun. 28, 2018

Related U.S. Application Data

(60) Provisional application No. 62/438,111, filed on Dec. 22, 2016.

(51) Int. Cl.
*B01D 53/04* (2006.01)
*B01J 20/18* (2006.01)
(Continued)

(52) U.S. Cl.
CPC .......... *B01D 53/047* (2013.01); *B01D 53/02* (2013.01); *B01D 53/261* (2013.01); *B01J 20/08* (2013.01);
(Continued)

(58) Field of Classification Search
CPC .................. B01D 2259/4145; B01D 53/02; B01D 53/04; B01D 53/047; B01D 53/261;
(Continued)

(56) References Cited

U.S. PATENT DOCUMENTS 4,526,877 A 7/1985 Acharya et al.
5,769,928 A 6/1998 Leavitt
(Continued)

FOREIGN PATENT DOCUMENTS

EP 1 080 771 A1 3/2001
EP 2 198 946 A1 6/2010
(Continued)

OTHER PUBLICATIONS

Machine-generated English translation of FR 2794993 A1, published Dec. 2000.*
(Continued)

*Primary Examiner* — Frank M Lawrence, Jr.
(74) *Attorney, Agent, or Firm* — Ralph J. Mancini

(57) ABSTRACT

The present invention relates generally to an attrition resistant core-in-shell composite adsorbent comprising at least a zeolite-containing $CO_2$ removal adsorbent and a binder on an inert dense core. The attrition resistant core-in-shell composite adsorbent has an attrition loss of less than about 2 wt %. The core-in-shell composite adsorbent is preferably used in a multi-layered adsorption system in a cyclic adsorption process, preferably used in a PSA prepurification process prior to cryogenic air separation.

18 Claims, 1 Drawing Sheet

(51) Int. Cl.
*B01D 53/047* (2006.01)
*B01J 20/28* (2006.01)
*B01J 20/32* (2006.01)
*F25J 3/04* (2006.01)
*B01D 53/02* (2006.01)
*B01J 20/10* (2006.01)
*B01J 20/08* (2006.01)
*B01D 53/26* (2006.01)
*B01J 20/34* (2006.01)

(52) U.S. Cl.
CPC ............. *B01J 20/10* (2013.01); *B01J 20/18* (2013.01); *B01J 20/2803* (2013.01); *B01J 20/28035* (2013.01); *B01J 20/3204* (2013.01); *B01J 20/3234* (2013.01); *B01J 20/3236* (2013.01); *B01J 20/3238* (2013.01); *B01J 20/3289* (2013.01); *B01J 20/3293* (2013.01); *B01J 20/3433* (2013.01); *B01J 20/3491* (2013.01); *F25J 3/04169* (2013.01); *B01D 2253/104* (2013.01); *B01D 2253/1085* (2013.01); *B01D 2253/25* (2013.01); *B01D 2253/30* (2013.01); *B01D 2257/404* (2013.01); *B01D 2257/504* (2013.01); *B01D 2257/702* (2013.01); *B01D 2257/80* (2013.01); *B01D 2259/4145* (2013.01); *F25J 2205/64* (2013.01); *Y02C 10/08* (2013.01)

(58) Field of Classification Search
CPC ...... B01D 2253/104; B01D 2253/1085; B01D 2253/25; B01D 2253/30; B01D 2257/404; B01D 2257/504; B01D 2257/702; B01D 2257/80; B01J 20/18; B01J 20/2803; B01J 20/28035; B01J 20/3204; B01J 20/3234; B01J 20/3238; B01J 20/3293; F25J 3/04169; F25J 2205/64; Y02C 10/08
USPC .................. 95/96, 139, 129, 143; 96/154
See application file for complete search history.

(56) References Cited

U.S. PATENT DOCUMENTS

| | | |
|---|---|---|
| 5,779,767 A | 7/1998 | Golden et al. |
| 6,027,548 A | 2/2000 | Ackley et al. |
| 6,284,021 B1 | 9/2001 | Lu et al. |
| 6,358,302 B1 | 3/2002 | Deng et al. |
| 6,638,340 B1 | 10/2003 | Kanazirev et al. |
| 6,790,260 B2 | 9/2004 | Ackley et al. |
| 8,657,924 B2 | 2/2014 | Zheng et al. |
| 8,814,985 B2 | 8/2014 | Gerds et al. |
| 9,737,846 B2 * | 8/2017 | Carstensen ............ B01J 20/183 |
| 2002/0103074 A1 * | 8/2002 | Wheelock ............. B01D 53/48 502/159 |
| 2018/0001302 A1 * | 1/2018 | Lee ......................... B01J 20/08 |
| 2018/0008958 A1 * | 1/2018 | Choi ....................... B01J 20/20 |

FOREIGN PATENT DOCUMENTS

| | | |
|---|---|---|
| FR | 2794993 A1 | 12/2000 |
| WO | 2013/022521 A1 | 2/2013 |

OTHER PUBLICATIONS

Alfons Brandt et al., "Novel zeolite composites and consequences for rapid sorption processes", Adsorption (2007) 13: 267-279, DOI 10, 1007/s10450-007-9019-3, Springer.

* cited by examiner

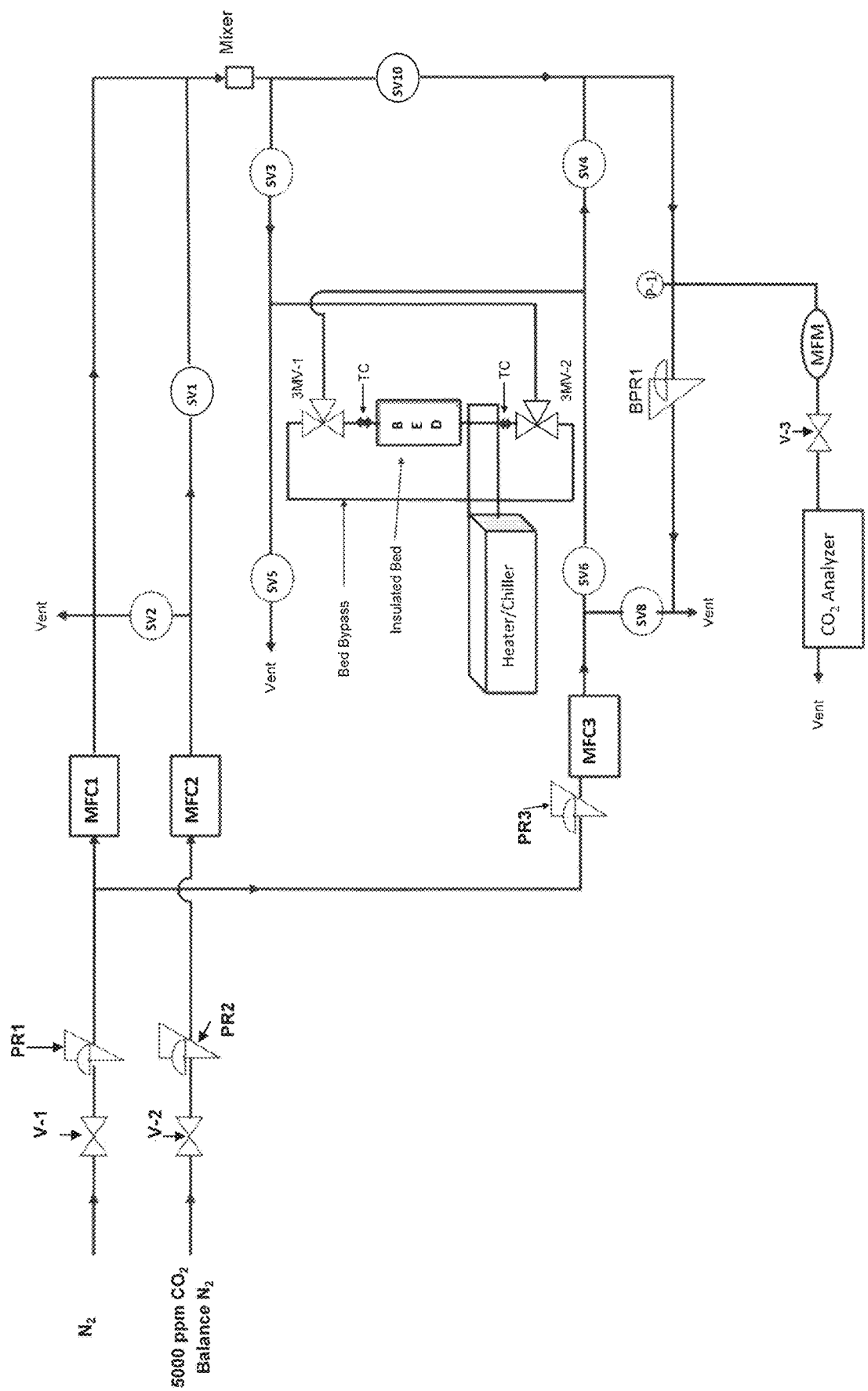

CORE-IN-SHELL COMPOSITE ADSORBENT FOR USE IN PSA PREPURIFIERS

RELATED APPLICATIONS

This application claims the benefit of U.S. Provisional Application Ser. No. 62/438,111, filed on Dec. 22, 2016, which is incorporated herein by reference.

FIELD OF THE INVENTION

The present invention provides composite adsorbents useful in adsorption processes for separating components of a gas stream. More particularly, the present invention is directed to attrition resistant core-in-shell composite adsorbents useful for the removal of contaminants, such as at least carbon dioxide ($CO_2$), but also nitrogen oxides, hydrocarbons and other trace impurities, from feed gas streams in a cyclic pressure swing adsorption (PSA) process prior to further processing, especially prior to cryogenic air separation processes. Preferably, the attrition resistant core-in-shell composite adsorbent is used in an adsorption system with a first adsorbent layer to remove water or water vapor.

BACKGROUND OF THE INVENTION

Conventional air separation units (ASUs) for the production of nitrogen, oxygen, and argon using cryogenic distillation technology are well known. ASUs typically separate air into its primary component gases at very low or cryogenic temperatures using one or more distillation columns. It is essential that certain impurities such as water vapor, carbon dioxide, nitrogen oxides, and trace hydrocarbons be removed from the compressed air feed prior to cryogenic distillation to avoid freezing of the impurities in the cryogenic equipment and potentially causing explosion. Any freezing will require stopping the process to remove the detrimental solid mass of frozen gases which is costly and can damage equipment. Generally, the content of water vapor and carbon dioxide in the compressed air feed stream must be less than about 0.1 ppm and about 1.0 ppm, respectively in order to prevent freeze up of these gases in an ASU.

The air feed stream is therefore cleaned or purified to remove these impurities prior to distillation typically by an adsorption process employing two or more vessels filled with beds of one or more adsorbents which selectively adsorb the impurities. Once an adsorption bed is saturated with impurities, it needs to be regenerated by removing the impurities so the bed is ready for further use.

Current commercial methods for this pre-purification of air generally include either one of or a combination of a cyclic pressure swing adsorption or temperature swing adsorption process. Pressure swing adsorption (PSA) uses a change in pressure, including vacuum, to regenerate the adsorbent and temperature swing adsorption (TSA) uses a thermal driving force such as a heated purge gas to desorb the impurities. The TSA process usually requires much lower amount of purge flow compared to PSA and affords a longer cycle time, typically in the range of 4 to 10 hours. The PSA process requires a greater amount of purge flow and affords a much shorter cycle time in the order of minutes. Moreover, there is no requirement for regeneration heat energy in PSA as opposed to TSA. Hence, when there is sufficient waste nitrogen available in a cryogenic air separation plant, the PSA process is usually a preferred option for air prepurification due to its simplicity, lower capital cost, and lower operating cost.

One disadvantage of the PSA process is that the adsorbents do not always get completely regenerated at the completion of the purge step and hence their dynamic capacity, the ability to remove the desired components, is lowered compared to the adsorbents regenerated in TSA processes. As a result, the PSA process is typically run for short cycle times necessitating that the bed undergoes blowdown (vent) and repressurization at fairly frequent intervals. During the blowdown step, there is a noticeable loss of air trapped within the void spaces of the vessel and piping as well as the air adsorbed on or within the adsorbents. This air loss, referred to by various terms such as blowdown loss, vent loss, or bed switch loss, represents a significant waste as the air is not utilized towards air separation downstream of the prepurifier. More significantly, there is an operational cost disadvantage as the air lost during bed switches utilizes valuable compression power. Accordingly, there is an increasing need to reduce this power requirement and increase the operational efficiency of the PSA prepurification process.

One way to lower the power requirement of the PSA process is to reduce the blowdown or bed switch loss described previously. This can be accomplished by reducing the frequency of bed blowdown and repressurization, for example by extending the cycle time for which the bed is kept online prior to being switched to regeneration. However, since the conventional commercial adsorbents, including zeolite-alumina composites, afford only modest dynamic working capacities for removal of the common air contaminants described above, an increase in cycle time would require either reducing the feed flow significantly at a fixed bed size or require a drastic increase in the bed size at a fixed feed flow rate. However, it has been found that by modifying the adsorbents employed to provide increased working capacities the improvements required can be achieved.

One strategy to increase the mass transfer rate of an agglomerated adsorbent particle is to reduce the particle size of adsorbent aggregates such as that disclosed in U.S. Pat. No. 6,790,260. This will increase the adsorption and/or desorption kinetics by reducing the path length needed for adsorbates to travel through the rate-limiting macropores of the agglomerated adsorbent. Reducing the particle size, however, has its limitations: higher pressure drop and increased risk of fluidization in unconstrained adsorption beds quickly become issues for adsorption process and system designs. Moreover, containment and manufacturing of small particle sized agglomerates represent other drawbacks that need to be resolved.

Another strategy to increase the mass transfer rate is to formulate the adsorbent as a composite adsorbent by mixing zeolite and alumina. Such composite adsorbents are disclosed in U.S. Pat. Nos. 5,779,767; 6,027,548; 6,358,302; 6,638,340; and 8,65,7924.

Yet another strategy to increase mass transfer rate can be to formulate an adsorbent in the form of a core-in-shell adsorbent. For example, Lu et al (EP1080771; U.S. Pat. No. 6,284,021) described a core-in-shell composite adsorbent with an inner core comprising a non-porous and non-adsorbent material and at least one outer layer comprising an adsorbent material forming a shell. Such composite beads having different ratios of inner radius to outer radius were disclosed to improve the mass transfer in adsorption processes without reducing the particle size of the beads. No experimental data was reported. However, benefits of using a 4 mm diameter composite bead over a conventional 2 mm diameter adsorbent bead were estimated by simulating production of 55 metric tons of oxygen product from air in a VSA plant. Composite beads with a non-porous core have a lower active adsorbent content in comparison to homogeneous adsorbent beads therefore resulting in lower overall capacity, which however is offset by the improved mass transfer rate.

Brandt et al. published results of O2-VPSA pilot plant tests using core-in-shell adsorbents (80wt % NaX zeolite, 20wt % attapulgite clay as shell) in Adsorption 13: 267-279, 2007. Table 4 in this publication lists core-in-shell adsorbents wherein the shell contains NaX zeolite and attapulgite clay in an 80/20 wt % ratio and wherein the core is a solid inert core of the formed-glass granules or quartz sand type. Sample 1 in Table 4 is a comparative example of a granule without any core present. Sample 1 is described under section 4.2 as a "state of the art full body NaX zeolite". In column 7 of Table 4, the volume-related productivity at 90% purity is provided for the comparative sample 1 and for the core-in-shell compositions. From these data, it is clear that the volume-related productivity is highest for the comparative sample 1 and lower for all of the core-in-shell compositions (samples 2-11). Thus, the comparisons in Table 4 and discussion in section 4.2 of the publication indicate that an adsorbent bed of a given diameter and height using conventional adsorbent beads treats higher feed flow than an adsorbent bed containing any of the core-in-shell adsorbent beads. The publication further discloses that the core-in-shell adsorbent shows improved performance only when the total amount of active adsorptive material in the bed is used as the basis (column 8, zeolite-content related productivity).

Gerds et al. (EP2198946; U.S. Pat. No. 8,814,985) disclosed another type of core-in-shell composite adsorbent, having a porous and non-adsorbent core and a porous and adsorbent shell. The porous cores are taught to be made up of agglomerates formed from 0.01 to 5 µm particles of inorganic material containing hydroxyl groups, wherein the mean particle size of agglomerates is equal to or smaller than the mean particle size of agglomerated adsorbent particles in the shell. Adsorbent beads containing both porous core and porous shell are shown to exhibit higher crush strength than adsorbent beads containing a non-porous core and a porous shell. Results of pilot testing of core-in-shell composite adsorbent beads in a hydrogen PSA process to produce high purity hydrogen product, in a TSA process to remove nitrogen impurity from helium, and in a PVSA process for producing 90+/−0.5% purity oxygen product from air are reported that indicate improved performance over that of conventional homogenous adsorbent beads.

There is a continuing need for superior volumetric performance and attrition resistant adsorbents for use in PSA prepurifiers in cryogenic air separation applications. Volumetric performance of an adsorbent can be calculated by dividing the volumetric flow rate of feed gas at standard conditions of temperature and pressure by adsorber vessel volume occupied by adsorbent bed. For a fixed bed size (adsorber vessel volume occupied by adsorbent bed) the operators can easily rank various adsorbents based on experimental data or simulation results of feed flow rates. Another performance indicator commonly used by plant operators is called bed-size factor, which is calculated by dividing feed flow rate by cross-sectional area of adsorbent bed. Ranking of adsorbents based on this indicator assumes each adsorbent is loaded in the adsorber vessel to same height. A suitable adsorbent must not only produce purified air stream, but indeed it must also have acceptable physical properties. Physical integrity of the adsorbents is an important commercial consideration in their selection. In PSA and TSA systems, cyclic process conditions may cause adjacent adsorbent particles to contact and abrade each other. Particles can experience surface attrition and/or break up into smaller particles. This can result in higher pressure drop, loss of adsorptive material from the adsorbent bed, as well as plugging or other problems in downstream equipment. Since the active adsorptive material of a core-in-shell adsorbent resides in the shell, attrition resistance property of the adsorbent is a much stronger consideration in their selection for use in commercial scale prepurifiers.

BRIEF SUMMARY OF THE INVENTION

The present invention is directed to attrition resistant core-in-shell composite adsorbent that maintains good physical strength and exhibits higher adsorption performance for removing gaseous impurities from feed gas streams in adsorption processes. The attrition resistant core-in-shell composite adsorbent can be used in $CO_2$ removal adsorption processes or can be used as part of a multi-layered adsorption system in a cyclic adsorption process for the prepurification of air.

Preferred compositions with acceptable physical strength while exhibiting high performance in lab cyclic adiabatic breakthrough tests (conducted in a lab scale system described later) are zeolite-clay shell on an inert dense material as core, wherein the shell porosity is about 30% to about 50%, the zeolite content ranges from about 10 wt % to about 40 wt %, and the overall inert content ranges from about 50 wt % to about 90 wt %. The non-adsorbing inert dense core material has a porosity of less than about 10%, preferably less than about 5%. The average diameter ratio of core to the product bead ranges from 20-90%, preferably 40-80%, and most preferably 50 to 75% range; wherein the product bead size is about 1 mm to about 5 mm.

In one embodiment, a core-in-shell composite adsorbent is provided for use in removing at least $CO_2$ from a process gas stream in an adsorption process. The core-in-shell composite adsorbent comprising a zeolite-containing $CO_2$ removal adsorbent shell and an inert dense core of natural sand wherein the attrition resistance of the composite adsorbent measured as percent weight loss is less than about 5 wt %, preferably less than about 2 wt %, and more preferably less than about 1 wt %.

In another embodiment, a multi-layered adsorption system for use in separating gases in a cyclic adsorption process is provided comprising two or more adsorbent layers wherein the first layer is at least a water vapor removal adsorbent and the second layer is a core-in-shell composite adsorbent comprising at least a zeolite-containing $CO_2$ removal adsorbent forming the shell and an inert dense core of natural sand wherein the attrition resistance of the composite adsorbent measured as percent weight loss is less than about 5 wt %, preferably less than about 2 wt %, and more preferably less than about 1 wt %.

In yet another embodiment, a cyclic gas adsorption process for removing at least $CO_2$ from a gas stream having less than 5% $CO_2$ is provided. The process comprises the step of contacting the gas stream with a multilayer adsorption bed comprising two or more layers wherein the first layer is at least a water vapor removal adsorbent and the second layer is a core-in-shell composite adsorbent for removing at least $CO_2$ from the gas stream. The core-in-shell composite adsorbent has a shell comprising a zeolite-containing $CO_2$ removal adsorbent and an inert dense core of natural sand wherein the attrition resistance of the composite adsorbent measured as percent weight loss is less than about 5 wt %, in another embodiment less than about 2 wt %, and in yet another embodiment less than about 1 wt %.

The present invention teaches that an active zeolite containing shell coated on inert and dense core with 50 to 80% diameter ratio range, wherein volumetric performance of said adsorbent is greater than or equal to 0.70 BSF (m3/s.m2), in another embodiment greater than or equal to 0.76 BSF (m3/s.m2). In a typical PSA system, operating with same absolute volumetric loading, the adsorbents of the invention performed 30 to 70% more efficiently than conventional uniform adsorbents.

DETAILED DESCRIPTION OF THE DRAWINGS

FIG. 1 is a schematic of the cyclic test system of the invention.

DETAILED DESCRIPTION OF THE INVENTION

The present invention is directed to a superior core-in-shell composite adsorbent which is preferably used in a multi-layered adsorption system in a cyclic adsorption process for removing or separating gas components. As described herein, but not intending to be limited to, the adsorption process is used to remove undesirable gas components (impurities) in air prior to sending the purified air to a cryogenic air separation process designed to separate at least its primary components; namely oxygen, nitrogen, and argon. The adsorption process removes the impurities from an air feed gas stream by contacting the feed gas stream with the adsorption system in a conventional adsorption apparatus. While the adsorption process can be a PSA, TSA or VPSA (Vacuum Pressure Swing Adsorption) unit or combination thereof as is well known; or any cyclic adsorption system for separating at least $CO_2$; the inventive adsorbents are preferably used with PSA or VPSA systems used in prepurification of feed air to an air separation unit (ASU). Such PSA or VPSA prepurification systems are known as air prepurification units (PPUs).

The PSA or VPSA units or systems separate gas species from a mixture of gases under elevated pressure according to the gas species' molecular characteristics and affinity for the adsorbent. The feed air is passed through a first porous bed packed with the adsorbent material which adsorbs the target gas species at higher pressures and then the process reverses to a lower pressure and process gas is used to purge and desorb the gas species in the adsorbent material in the bed. Typically, this process alternates between two or more beds maintaining a continuous operation. Most preferred are PSA units or systems which include 2 or more beds and which are conducted at or near ambient temperature to remove the impurities in air. Any reactor or vessel configuration can be employed such as a radial or axial configuration.

In general, the steps in the multi-bed PSA cycle include: (1) adsorption (feed) at high pressure, (2) countercurrent blowdown to lower pressure, (3) countercurrent purge with a gas relatively free of impurities, and (4) repressurization to high pressure with either feed air or purified air. The regeneration of the adsorbents in a PSA process is achieved by a combination of a simple reduction in pressure and purge with an impurity-free gas, such as waste $N_2$ available from the cryogenic air separation unit. The ratio of the flow rate of purge gas to that of the feed air is known as the purge-to-feed ratio (P/F). Since this regeneration method is less efficient than the use of thermal energy, as for example in a TSA process, the P/F ratio is typically higher in PSA processes. Also, a considerable residual loading of the impurity adsorbates remain on the adsorbents even at the end of the regeneration step. The difference between the adsorbent loading at the end of the feed step and that at the end of purge step is known as the working capacity. The working capacity is a function of the various operating conditions such as impurity concentrations in the feed and purge, pressure, temperature, and P/F and is also dependent on the selectivity and capacity of the adsorbent.

The attrition resistant core-in-shell composite adsorbent compositions of present invention offer significantly improved working capacity compared to conventional alumina-zeolite only composites or mixtures. The current invention leverages sodium zeolite X mixed with a binder to form an adsorptive shell on an inert dense core of extremely low porosity material such as natural sand particle. With the surprisingly preferred range of core diameter ratio of around 60-80%, such in-expensive core-in-shell composite adsorbents exhibited good attrition resistance and significantly improved PSA performance, thus are commercially relevant. Without wishing to be bound by theory, it is believed that the addition of the binder to the composite improves the attrition resistance properties of the composite, potentially suppressing undesirable loss of adsorbent during loading and while in use.

For cores with irregular shapes, such as typical for natural silica sand, etc., the term diameter is determined by mathematical average of weight percentage particles retained at a set of US meshes with corresponding regulated screen openings. Such sizing practice by mesh screening is familiar to those skilled in the art, and the average diameter of the core as well as the core-in-shell composite adsorbent can be calculated using the following equation:

$$D = \Sigma (R_{n-1} + R_n) * G_n / 200$$

Where

D: diameter, as in average particle size (mm)

G1 . . . Gn: the weight percent of particles retained on a given mesh screen

R1 . . . Rn: mesh size of each adjacent screen (mm)

n: the number of screen used

An example of such screen analysis for a sample of natural sand that can be used as core material to make a batch of core-in-shell composite adsorbent for use in a PSA system is given below. Using the above equation the average diameter of the core material is 1.415 mm.

| Example of Screen Analysis | | | | | | |
|---|---|---|---|---|---|---|
| Sample #: Natural sand prescreened 12x16 | | | | | | |
| Initial Sample Wt = | | 707.100 g | | Date May 12, 2016 | | |
| Screen No. | Container Wt. (g) | With Sample (g) | Wt On Screen (g) | wt % On Screen G | Mesh Size (mm) R | Cumulative Diameter (mm) D |
| 10 | 391.230 | 391.230 | 0 | 0 | 2.000 | 0.000 |
| 12 | 430.540 | 431.370 | 0.830 | 0.12 | 1.700 | 0.002 |
| 14 | 421.150 | 915.520 | 494.370 | 70.13 | 1.400 | 1.087 |

| | | | Example of Screen Analysis | | | |
|---|---|---|---|---|---|---|
| 16 | 391.960 | 570.060 | 178.100 | 25.27 | 1.180 | 0.326 |
| 18 | 388.130 | 419.740 | 31.610 | 4.48 | 1.000 | 0.049 |
| | Total Sample Wt. = | | 704.91 g | Average Diameter D = | | 1.415 mm |

The term composite is used to indicate that the adsorbent particle also referred to as adsorbent bead is formed from at least two components having distinctly different chemical composition. Composite adsorbents are easily distinguished from adsorbent mixtures in that at least two components are present within a single adsorbent particle or adsorbent bead and combined together during the adsorbent manufacturing process and not physically mixed or blended together thereafter. The core-in-shell composite adsorbent of present invention is distinctly different from a zeolite-alumina composite bead formed by blending crystallites of zeolite with micron or sub-micron sized particles of alumina or an alumina source during the manufacturing process, such that a given bead of the final composite adsorbent product contains both alumina and zeolite particles in direct contact with one another. The core-in-shell composite adsorbent of present invention is also distinctly different from adsorbent whose core is formed in a separate agglomeration step using micron or sub-micron sized particles of core material.

In the present invention, core-in-shell composite adsorbent compositions for use in PSA processes are described wherein a core-in-shell composite adsorbent has a shell comprising at least a zeolite such as NaX and a binder such as clay and an inert dense core of a substantially non-porous material such as sand and the like. The zeolite and binder are selected and blended together to form an intimate mixture which thereafter is transferred to granule agglomeration equipment wherein non-porous inert particles, for example natural sand particles of a defined average diameter are added to serve as cores. Appropriate chemicals such as polyvinyl alcohol (PVA) may be used in concentrations ranging from about 0.5 wt % to about 5 wt %, in another embodiment 1 wt % to 3 wt % of the zeolite and binder mixture to assist in the formation of green core-in-shell composite beads. The resulting green product is calcined at a temperature of about 550° C. to about 650° C. in an atmosphere of dry air or an inert purge gas wherein dewpoint is less than about −40° C. to about −62° C. to obtain core-in-shell composite adsorbent product.

All percentages throughout this specification are in weight percent and expressed on a dry weight basis unless otherwise noted. Since all commercial size batches or lots of adsorbents will have some variance, the exact ratios will typically vary within about 2 percentage points and such small variations are considered within the scope of this invention.

The core-in-shell composite adsorbent of the present invention comprises three components: (1) 10-80 wt % of an inert dense core having extremely low porosity, significantly lower than alumina: in one embodiment less than 10% porosity, in another embodiment less than 5%; (2) 10-50 wt % zeolite having a SiO2/Al2O3 ratio less than about 5.5, in another embodiment less than or equal to 2.5. Examples of suitable zeolites include Faujasite type zeolites, especially zeolites NaY, 13X and NaLSX (NaX2.0) type zeolites; (3) 5-25 wt % clay, in another embodiment 10-20 wt %, serving as a binding agent together with zeolite in the shell; 0.5-5 wt % polyvinyl alcohol serving as a coating aid, in another embodiment 1-3 wt % polyvinyl alcohol serving as a coating aid, as blended together with the zeolite and clay during the agglomeration.

The core-in-shell composite adsorbent, also referred to as bead or particle, is generally of the same average size as used for conventional PSA process wherein the average size is calculated as illustrated in the screen analysis example above. For example the core-in-shell composite adsorbent of present invention can be a 2 mm bead, typical average size of 8×12 mesh particles. Such a bead can have a core that has a diameter of about 0.4 mm to about 1.8 mm, in another embodiment about 0.8 mm to about 1.6 mm, and yet in another embodiment about 1 mm to about 1.5 mm. This constitutes the core to occupy about 20% to about 90% of the bead diameter, in another embodiment about 40% to about 80%, and in yet another embodiment about 50% to about 75%. The bead has good physical strength as indicated by attrition weight loss of less than about 2 wt %, in another embodiment less than 1 wt %, and in still another embodiment less than 0.5 wt %.

The composite adsorbent of this invention can be used for various adsorption processes, but is typically used as one of the layers in an adsorption system employing at least two layers of different adsorbents. The term "system" as used herein implies that there are multiple adsorbent layers either in direct contact or separated by a suitable separation means within the adsorbent bed. Each adsorbent layer can be comprised of a uniform or single material, composites of different materials, or any mixtures or combinations thereof, provided that, at least one layer is the composite adsorbent of this invention. The adsorbent layers are configured to remove certain gas impurities from the process gas in predetermined sequence during the process flow. For example, water vapor is often removed by the first layer prior to removing other gases with subsequent layers.

The composite adsorbent of this invention will be described herein as used in a preferred embodiment as a two layer adsorption system for use in a pre-purification unit (PPU) prior to cryogenic distillation. This description is not intended to limit the invention to air separation systems or to two layered adsorption systems.

The first layer of the adsorption system is in closest proximity to the air feed stream inlet and its primary purpose is to substantially remove the water or water vapor in the feed, although some $CO_2$ may also be removed by co-adsorption in the region of lower water loading. The first layer can be any suitable hygroscopic or desiccant material such as activated alumina, silica gel, various molecular sieves with activated alumina most common and preferred. The second layer is the core-in-shell composite adsorbent of this invention which contains a zeolite adsorbent capable of $CO_2$ selective adsorption and/or other air contaminants more effectively. The core-in-shell composite adsorbent is attrition resistant. The zeolite-containing shell removes $CO_2$ in the gas stream entering the core-in-shell composite adsorbent layer and may also remove any trace hydrocarbons present in the feed, particularly acetylene, and any nitrogen oxides such as $N_2O$.

In the present invention, the core-in-shell composite adsorbent has an inert dense core and a shell having adsorptive capacity. The shell comprises at least 2 components, and preferably 3 components. The choice of zeolite type for effective air purification is preferably from the Faujasite group and especially zeolites X and Y. By such core-in-shell configuration as described above, both mass transfer rate and attrition resistance are significantly improved, thus enabling to use stronger zeolites, including zeolite X having $SiO_2/Al_2O_3$ less than or equal to 2.5 and including the low silica X (or $SiO_2/Al_2O_3=2.0$) grade, and effectively regenerate under PSA cycling. Other low silica zeolites including zeolite A are expected to offer acceptable performance, although less preferred due to their intrinsically lower $CO_2$ capacity compared to the larger pore Faujasite type zeolites, especially zeolite X. The compositional range of 10-50 wt % has been found to be preferred from the standpoint of ease of regeneration under PSA prepurifier operating conditions. In another embodiment the core-in-shell composite adsorbent of the invention comprises 15-40 wt % zeolite and in another embodiment 20-35 wt % zeolite.

As further explained below, it is preferred to use binding agents in the composite. Any commonly known binding agents used in adsorbent processing which provide sufficient crush strength and which do not interfere with the adsorption process can be employed. Preferred binding agents are clays. In terms of clay selection, the clay is preferably selected from the group that includes, but is not limited to attapulgite, sepiolite, kaolin, haloysite and mixtures thereof that help give the product composite adsorbents sufficient physical strength for use. The compositional range for the clay has been determined based on that which provides the required crush strength and/or attrition resistance for use. The amount of clay in the composite of the invention is generally in the range of from about 5 to about 25 wt % of the shell material; in another embodiment from about 10 to about 20 wt % of the shell material. The preferred compositional range for the clay has been determined based on the required attrition resistance for use in cyclic adsorption processes.

The inert dense core of the present invention can generally have an overall porosity of less than 10%, in another embodiment less than about 5%, in another embodiment less than about 2%. Preferred low porosity dense core materials include, but are not limited to dense ceramics, sand, bauxite, cordierite, analcite, hematite, magnetite, granite, marble, dolomitic limestone, shale, etc.

Preferred forms for the core-in-shell composite adsorbents described herein are not limiting and include beads, pellets, extrudates and the like. In terms of preferred particle sizes, those that give acceptable pressure drop in a PSA prepurifer are acceptable, for example particles in the 8×14 US mesh size range are typical for many designs.

One of the problems of core-in-shell composite adsorbent particle is keeping the adsorptive shell on an inert dense core particle. This ability of the shell to remain on the inert dense core particle is measured by attrition loss by placing a known weight of core-in-shell composite adsorbent particles on a 595 micron (28 mesh Tyler) screen and the screen is tapped for 30 minutes. Attrition loss is the weight percent of sample lost through the screen. Attrition loss is a physical property, determined and considered to be a measure of the propensity of the material to produce fines in the course of transportation, handling and use.

The specific examples provided herein are for NaX zeolite-clay coated on non-porous sand composite adsorbent preparation, but the teachings are applicable to any such adsorbent recipe and manufacturing for other applications, such as $CO_2/H_2$ separation for $H_2$ production, etc.

Preferred form for the core-in-shell composite adsorbents described herein include bead as known in the art. In terms of preferred particle sizes, any size that gives acceptable pressure drop in a PSA PPU are acceptable, for example particles in the 8×14 US mesh (1.4 to $2.4×10^{-3}$ m) size range are typical for many reactor or bed designs.

According to another embodiment of this invention, the core-in-shell composite adsorbent can itself be used in certain gas adsorption processes to remove $CO_2$ and other gases. In this embodiment, the core-in-shell composite adsorbent can be used in a gas purification process although it is practically limited to feed streams containing not more than 5% $CO_2$.

The examples below use the inventive core-in-shell composite adsorbents under cyclic test conditions representative of a typical PSA process. The examples below include comparative examples (labeled Comparative Examples) and examples within the scope of this invention (labeled as Examples). The comparative examples are used to illustrate the unexpected results achieved with the inventive core-in-shell composite adsorbents. The weights below for the zeolites, clay, and sand are expressed on a dry weight basis.

For the examples and comparative examples described below, the following generalized method of making was employed.

Step 1: Measure and mix zeolite NaX and actigel clay (a type of attapulgite) powders (both provided by Hengye Company in Shanghai, China), as well as the corresponding amount of PVA solution (from Sigma Aldrich) as forming aid (dry weight basis versus zeolite-clay mixture); Dry mix all the above in a mixer for approximately 1 hour.

Step 2: Pre-screen the core particles to the desired particle size, ranging from 1.1 mm to 1.6 mm, load appropriate amount of such cores into small wheel as the bead forming machine. Spray water, at same time gradually add the above powder mixture, while the wheel rotates at steady speed. Grow the beads by continuing such for approximately 30 to 45 minutes. In a few specific examples, the coating process was carried out in an accretion wheel mixer for the bead forming.

Step 3: Dry and calcine the green beads in air flow up to 593° C. for approximately 2 hours.

The resulting core-in-shell composite adsorbent physical properties were measured. Mercury (Hg) porosimetry measurements to determine the intra-particle void volume and adsorbent porosity were performed using a Micromeritics AutoPore IV instrument. Approximately, 1 g of sample was used for each measurement. The contact angle was fixed at 135° and intrusion and extrusion data were recorded over the pressure range from 0.5 psia to 61,000 psia.

Attrition weight loss was measured using a single layer of finished product beads, around 50 g on dry basis. The pre-screened beads, typically of 8×12 mesh sizes, were then shaken at a steady rate in a shaker for 5 minutes. The weight of those beads passing through the screen of one mesh size smaller than the smallest product beads, 14 mesh typically, was then calculated and attributed as the attrition loss.

Sample tap density was measured with a pre-weighed amount of product beads loaded in a volumeter, tapped in machine for 1000 strokes, recorded the final volume thus calculated the packing density with the weight divided by the volume.

In order to test the performance of the adsorbents under conditions which are representative of those experienced by the core-in-shell composite adsorbent in a PSA prepurifier, we have designed a lab scale cyclic test system that measures the dynamic capacity of the adsorbent under PSA cycling, with process diagram as shown in FIG. 1.

The lab scale system is essentially a cyclic breakthrough equipment for $CO_2$ (and/or $N_2O$) running a 4-step cycle: (1) Pressurization, (2) Adsorption under higher pressure, (3) Depressurization to close to atmospheric pressure, and (4) Regeneration under lower pressure. The test parameters are set to reflect PSA prepurifer operation after applying an appropriate scaling factor to account for the small size of the lab adsorption bed. Two important parameters are used to evaluate the material productivity, where productivity is a measure of the amount of air which can be purified with the adsorbent being tested under the PSA conditions, namely the feed gas flow rate and cycle time. The higher the gas feed flow through a specific sorbent bed the higher the productivity; similarly extending the cycle time of PSA prepurifiers would result in lower blowdown losses and save compressor power etc.

Specifically, the lab-scale pressure swing adsorption system consists of a vertical cylindrical stainless steel vessel 6 inches long and having an internal diameter of 0.517 inch. In order to have better simulation with plant operation, the lab $CO_2$ cyclic breakthrough tests are configured to run close to adiabatic conditions, by adding insulation around the adsorbent bed (which is otherwise exposed to ambient conditions) to prevent excessive heat leak to ambient to account for the thermal effects observed in large (plant scale) adsorbent vessels.

The PSA cycle included: Step 1. Pressurization of the adsorbent bed under $N_2$ to 145 psia for 30 sec., with SV2, SV3, SV4 and SV8 valves open, while SV1, SV5, SV6 and SV10 closed; Step 2. Adsorption with mixed gases of typically 400 ppm $CO_2$ in $N_2$ at 145 psia for 180 sec., with SV1, SV3, SV4 and SV8 valves open, while SV2, SV5, SV6 and SV10 closed; Step 3. Depressurization to 15 psia within 10 sec., with SV2, SV5, SV8 and SV10 valves open, while SV1, SV3, SV4 and SV6 closed; and Step 4. Purge/Regeneration with countercurrent flow of the bed at 15 psia for 150 sec, with SV2, SV5, SV6 and SV10 valves open, while SV1, SV3, SV4 and SV8 closed. The feed gas flow rate (MFC1 and MFC2) during the adsorption is manually adjusted to ensure that the bed sustains maximum 1 ppm $CO_2$ at the outlet during adsorption step, while the purge flow (MFC3) is adjusted accordingly with a purge-to-feed ratio of typically 60%.

The pressurization step was carried out by charging $CO_2$-free nitrogen into the adsorption vessel. During the adsorption step the pressurized nitrogen (MFC1) was blended with contaminant such as carbon dioxide (MFC2) achieving approximately 400 ppm composition, and preheated to 40° C. then passed upwards through the adsorption vessel, which itself was un-heated but insulated as in an adiabatic environment. Purge regeneration was carried out by passing $CO_2$-free nitrogen (MFC3) countercurrent through the vessel at 25° C. During the process the $CO_2$ at exit of the adsorption vessel was measured using a multi-gas analyzer (Siemens, model Ultramat 5E).

The above-described PSA cycle was repeated continuously more than 250 times or until stabilization. The adsorbent performance (productivity) was described as bed-size-factor (B SF), calculated as amount of regenerable feed gas flow rate (N2 contaminated with 400 ppm $CO_2$, MFC1+ MFC2) per cross sectional area of the lab adsorbent vessel (0.0021 square inch, or 10-6 m2) to produce clean product with not more than 1 ppm $CO_2$.

EXAMPLES

Comparative Composites: Comp#1 is same as Com.A1 in U.S. Pat. No. 8,657,924, a typical zeolite-alumina commercial composite available from Shanghai Hengye.

Comp #2 is a traditional zeolite NaX sieve bound with clay also available from Shanghai Hengye.

Preparation of Core-shell Composites:

For all the core-in-shell composite adsorbent samples as described here, the process steps described above were followed for testing. Adsorbent beads of 2 mm average size were made using sand particles as dense inert cores. The adsorptive shell was formed using zeolite NaX and actigel clay as binder. Core-in-shell composite adsorbent samples listed in Table 1 were made using fixed amount of zeolite NaX and PVA (2 wt %) additives, with changing amount of actigel clay binder (10-20 wt % of zeolite and binder mixture.

17894-61N (10 wt % binder, 1.1 mm Sand particle as inert dense core): 3269 g of zeolite NaX powder obtained from Shanghai Hengye Co. (with Si/Al ratio between 2.1 to 2.2) was placed in a Muller type mixer, together with 363. g Actigel clay powder, both on dry weight basis. The powders were mixed for 1 hour. 311.3 g of PVA (brand name Optopix-35) was diluted with 1400g water. The diluted PVA was then slowly added to the above dry powder while mixing. The resulting mixture was air dried at room temperature for 2 days until total LOI (loss-on-ignition) reached 26.3%, then the mixture was subjected to grinding in Retch grinder for 15 minutes, obtaining sample product labeled as 17894-61P (P stands for powder). Placed 400 g of silica sand, obtained from Agsco, Co., screened to 16×18 mesh, in small wheel. The porosity of such natural sand is 1.2%, and it has near zero adsorption capacity with $CO_2$, etc. Slowly sprayed water while adding 900g net weight of 17894-61P until sufficient quantity of 2.0 mm (average diameter) beads formed, the total forming process lasted about 2 hours.

17894-57N (10% binder, 1.55 mm core diameter): 3269g of zeolite NaX powder obtained from Shanghai Hengye Co. (with Si/Al ratio between 2.1 to 2.2) was placed in a Muller type mixer, together with 363. g Actigel clay powder, both on dry weight basis. The powders were mixed for 1 hour. 311.3g of PVA (brand name Optopix-35) was diluted with 1400 g water, followed by slowly adding into above dry powder while mixing. Air dried mixture at room temperature for 2 days until total LOI (loss-on-ignition) reached 26.3%, then the mixture was subjected to grinding in Retch grinder for 15 minutes, obtaining sample product labeled as 17894-57P. Placed 435 g of 12×14 mesh Agsco silica sand, obtained from Agsco, Ohio, in small wheel. Slowly sprayed water while adding 400 g net weight of 17894-57P until sufficient quantity of 2.0 mm (average diameter) beads formed, the total forming process lasted 1.5 hours.

17894-80N (15% binder, 1.25 mm core diameter): Placed 2500 g of dry weight zeolite NaX powder (Shanghai Hengye Co.) in Muller mixer, together with 441.2 g dry weight Actigel clay powder, followed by mixing for 1 hour. Slowly added 238.1 g PVA (Optopix-35) diluted in 650 g water. Air dried mixture at room temperature for 3 days, then grinded in Retch grinder for 20 minutes, the powder thus made was labeled as 17894-79P. Placed 350 g of 14×16 mesh Sidley silica sand, obtained from R.W. Sidley Inc., Ohio, in small wheel. Slowly sprayed water while adding 450 g net weight of 17894-79P until sufficient quantity of 2.0 mm beads formed.

17894-92N (15% binder, 1.55 mm core diameter): Placed 2500 g of dry weight zeolite NaX powder (Shanghai Hengye Co.) in a Muller type mixer, together with 441.2 g dry weight Actigel clay powder, followed by mixing for 1 hour. Slowly added 238.1 g PVA (Optopix-35) diluted in 1350 g water. Air dried mixture at room temperature for 3 days, then further dried in Blue M furnace at 90C for 2 hours. The resulting mixture was subjected to grinding in Retch grinder for 15 minutes, obtaining sample product labeled as 17894-92P. Placed 350 g of 12×14 mesh Chinese silica sand (Shanghai Moton) in small wheel. Slowly sprayed water while adding 270 g net weight of 17894-92P until sufficient quantity of 2.0 mm (average diameter) beads formed.

17894-67N (20% binder, 1.55 mm core diameter): Placed 2500 g of dry weight zeolite NaX powder (Shanghai Hengye Co.) in a Muller type mixer, together with 625 g dry weight Actigel clay powder, followed by mixing for 1 hour. Slowly added 267.9 g PVA (Optopix-35) diluted in 1100 g water. Air dried mixture at room temperature for 2 days, then resulting mixture was subjected to grinding in Retch grinder for 15 minutes, obtaining sample product labeled as 17894-67P. Placed 400 g of 12×14 mesh Sidley silica sand in small wheel. Slowly sprayed water while adding 450 g net weight of 17894-67P until sufficient quantity of 2.0 mm (average diameter) beads formed.

17965-02 (15% binder, 1.55 mm core diameter): This sample was made in a similar manner as the sample 17894-92N described above, except using proportionally more ingredients. Placed 4018.8 g dry weight zeolite NaX powder (Shanghai Hengye Co.) in a Muller type mixer, together with 713.0 g dry weight Actigel clay powder, followed by mixing for 1 hour. Slowly added 285.7 g PVA (Optopix-35) diluted in 1575.0 g water. Air dried mixture at room temperature for 3 days, then further dried in Blue M furnace at 90 C for 4 hours. Then immediately loaded back in the Muller type mixer, about 9 kg at a time, and mulled to powder for 4 hours. Screened resulting material to less than 70 mesh, obtaining powder labeled as 17965-02P. Placed 900 g of 12×14 mesh natural silica sand (obtained from Shanghai Moton) in small wheel. Slowly sprayed water while adding 1400 g net weight of 17965-02P until sufficient quantity of 2.0 mm (average diameter) beads formed.

All above samples were subjected to overnight calcination in air at 593 C.

Lab Cyclic $CO_2$ Testing

Table 1 lists performance and physical properties of various core-in-shell composite adsorbent samples described above, as well as two commercial adsorbents: Comp#2 is clearly not suitable for PSA application, judging by the extremely low bed-size-factor as compared to Comp#1, the commercial PSA composite material. The bed-size-factor (BSF) listed in the last column in Table 1 is calculated by dividing the maximum feed flow (MFC1+MFC2) containing 400 ppm $CO_2$ while achieving a purified gas product containing less than about 1 ppm $CO_2$ by bed cross sectional area.

TABLE 1

| | Core | | | | Product | | | Volumetric Performance |
| --- | --- | --- | --- | --- | --- | --- | --- | --- |
| Samples | Type | size (mm) | Shell Type | Core Ratio | Density (kg/m3) | Porosity (%) | Attrition (wt %) | BSF (m3/s · m2) |
| Comp #1 | Composite (40%NaX—Al2O3) | | | | 590 | 44 | 0.2 | 0.46 |
| Comp #2 | Sieve (NaX-Clay15%) | | | | 660 | 32 | 0 | 0.09 |
| 17894-61N | Silica Sand (1.4% porosity) | 1.1 | NaX-Clay10% | 55% | 785 | 29 | 15.4 | 0.62 |
| 17894-57N | Silica Sand (1.4% porosity) | 1.55 | NaX-Clay10% | 78% | 980 | 22 | 93.7 | 0.78 |
| 17894-80N | Silica Sand (1.4% porosity) | 1.25 | NaX-Clay15% | 63% | 810 | | 0.6 | 0.70 |
| 17894-92N | Silica Sand (1.4% porosity) | 1.55 | NaX-Clay15% | 78% | 950 | 23 | 1.5 | 0.76 |
| 17894-67N | Silica Sand (1.4% porosity) | 1.55 | NaX-Clay20% | 78% | 980 | 22 | 1.8 | 0.76 |
| 17965-02A | Silica Sand (1.4% porosity) | 1.55 | NaX-Clay15% | 78% | 950 | 29 | 1.0 | 0.76 |

The core-in-shell sample with non-porous inert dense core, namely 17894-61N with natural silica sand, has a much higher density due to the higher density of the core. More importantly, its lab cyclic PSA performance showed around 35% improvement over the commercial homogeneous composite.

Due to its natural abundance, the silica sand exhibits the best option of cost-performance effectiveness. Work was therefore focused on improving its physical strength since it exhibited considerable attrition loss.

From Table 1, it is clear that increasing the core size from 1.1 mm (sample 17894-61N) to 1.55 mm (sample 17894-57N) while keeping the adsorptive shell composition fixed resulted in considerably higher attrition weight loss. Binder content greater than 10 wt % appear to yield attrition weight loss below 2 wt %, see examples 17894-80N (core to bead diameter ratio of 0.63, 15 wt % binder in adsorptive shell), 17894-92N and 17965-O2A (core to bead diameter ratio of 0.78, 15 wt % binder in adsorptive shell), and example 17894-67N (core to bead diameter ratio of 0.78, 20 wt % binder in adsorptive shell).

The PSA performance summarized in the last column of Table 1 indicate surprising results upon using core-in-shell adsorbents to purify a gas containing several hundred ppm of $CO_2$ as impurity in the feed to produce a purified product containing less than 1 ppm $CO_2$. Contrary to the teachings of Brandt et al. mentioned earlier, our results indicate that an adsorbent bed of a given diameter and bed height loaded with core-in-shell composite adsorbent can process a higher flow rate of contaminant containing feed than when the bed is loaded with a conventional non-core-in-shell composite adsorbent to the same height.

It is clear from Table 1 that the PSA performance (expressed in terms of productivity, defined above) can be greatly improved with the core-in-shell beads employing natural sand cores, provided that the core diameter ratio falls in the range of about 50% to about 90%. Such core-in-shell beads containing greater than 10 wt % binder in the adsorptive shell exhibit attrition weight loss below 2 wt %. The volumetric performance, expressed in the form of a bed size factor (BSF) in Table 1 for $CO_2$ removal, from a feed stream containing several hundred ppm of $CO_2$, is higher for the core-in-shell examples and lower for the comparatives (Comp #1 and #2) where an inert sorption-inactive core is not present. More specifically, the volumetric performance of the adsorbents of the invention is greater than or equal to 0.70 BSF (m3/s.m2), in another embodiment greater than or equal to 0.76 BSF (m3/s.m2). As the data show, in a typical PSA system, operating with same absolute volumetric loading, the adsorbents of the invention performed 30 to 70% more efficiently than conventional uniform adsorbents. This result is surprising, particularly in view of Brandt et al. publication mentioned above that teaches core-in-shell compositions (Table 4, samples 2-11) to have inferior volume-related productivity when producing 90% purity oxygen product or 93% purity oxygen product from air. Our invention is to use core-in-shell adsorbent to purify a gas stream containing $CO_2$ as an impurity in a PSA process whereas prior art disclosed inferior performance of core-in-shell adsorbents in VPSA or VSA process that produces a product highly enriched in oxygen such as 90% purity oxygen product or 93% purity oxygen product from a feed such as air containing about 21% oxygen.

Our results summarized in Table 1 also show attrition resistant performance of core-in-shell adsorbents having a porous shell and an inert non-porous core. This result is surprising in view of prior art mentioned earlier that showed inferior crush strength of a core-in-shell adsorbent having a porous shell and a non-porous core relative to that of a core-in-shell adsorbent having both porous shell and porous core.

PSA Pilot Testing

A larger batch (SRS 1920) of core-in-shell adsorbent bead sample 17965-02 was made and tested in a pilot facility described in U.S. Pat. No. 6,027,548. The pilot facility contained two adsorbers operating out of phase (one bed in adsorption, the other bed in a sequence of blowdown, purge and repressurization). Each adsorber vessel, 8.26 cm in diameter was loaded with adsorbent to form an adsorbent bed of 2.13 m in height. A simple four-step cycle was used as indicated above (e.g. adsorption, blowdown, purge and repressurization) with no bed-to-bed interactions. Cycle step times were as follows: 25 min. for adsorption; 3.0 to 5.0 min. for pressurization, and 30 to 40 s for depressurization (blowdown). Both beds were first loaded with same amount of activated alumina forming a first layer of adsorbent, alumina layer, 1.18 m in height. One vessel (bed A) was then loaded with 5.58 kg of commercial zeolite-alumina composite adsorbent (Comp# 1 sample) forming a second layer, 0.953 m in height, on top of the alumina layer in bed A. The other vessel (bed B) was loaded with a core-in-shell sample SRS1920 of the present invention on top of the alumina layer in bed B, forming a second layer, 0.953 m in height. The alumina layer, first adsorbent layer effectively removes all moisture in the feed air as well as some $CO_2$. The second adsorbent layer removes $CO_2$ to produce purified air product.

a. The two beds, bed A and bed B in the pilot plant were operated under same cycle conditions, namely temperature, pressure, feed flow, purge-to-feed ratio, as well as cycle times. The PSA pilot was operated for more than 1000 cycles over 2 months using a feed containing 450 ppm $CO_2$ at a constant feed flow rate. The purified air product leaving bed A (Comp# 1 adsorbent) contained 0.21 ppm $CO_2$, while the purified air leaving bed B (SRS 1920 core-in-shell adsorbent) contained less than 0.05 ppm $CO_2$ (below the detection limit of the $CO_2$ analyzer). A complete bed scan confirmed that the $CO_2$ breakthrough front has been pushed much earlier on the core-in-shell adsorbent in bed B, showing that there is much room for its improvement. The feed flow to both beds was gradually increased. After about 40% increase in feed flow, purified air leaving bed A contained more than 10 ppm $CO_2$ indicating $CO_2$ breakthrough, while the purified air leaving bed B (core-in-shell adsorbent) contained below 0.16 ppm $CO_2$. This suggests the feed flow to bed B can be further increased before purified air leaving bed B contains not more than 1 ppm $CO_2$. The improved volumetric performance of core-in-shell adsorbent over the conventional non-core-in-shell Comp# 1 in pilot facility is consistent with the lab test results (bed-size-factor, BSF) summarized in Table 1.

It is clear from Table 1 that the PSA performance (expressed in terms of productivity, defined above) can be greatly improved with the core-in-shell beads employing natural sand cores. The core-in-shell beads containing greater than 10 wt % binder in the adsorptive shell exhibited attrition weight loss below 2 wt %. The volumetric performance, expressed in terms of a bed size factor (BSF) in Table 1 for core-in-shell adsorbent beads having core diameter ratios in the range of about 55% to about 80% for $CO_2$ removal. For a feed stream containing several hundred ppm of $CO_2$, the volumetric performance of commercially available adsorbents (Comp #1 and #2) in which the inert sorption-inactive core is absent is significantly lower than the adsorbents of the invention. This result is surprising, particularly in view of Brandt et al. publication mentioned above that disclosed core-in-shell adsorbents (Table 4, samples 2-11) to have inferior volume-related productivity when producing 90% purity oxygen product or 93% purity oxygen product from air.

Additionally, the claimed invention is directed to the use of core-in-shell adsorbents in a PSA process to purify a gas stream containing $CO_2$ as an impurity. The superior results of the invention are surprising, especially since the prior art generally teaches that core-in-shell adsorbents exhibit inferior performance in VPSA or VSA gas separation processes for the production of oxygen, specifically, 90% purity oxygen or 93% purity oxygen from air.

Additionally, the results summarized in Table 1 also show superior attrition resistant performance of core-in-shell adsorbents of the invention having a porous shell and an inert non-porous core. This result is surprising in view of prior art mentioned earlier that teach inferior crush strength of a core-in-shell adsorbents having a porous shell and a non-porous core compared to core-in-shell adsorbents having both a porous shell and a porous core.

It should be apparent to those skilled in the art that the subject invention is not limited by the examples provided herein which have been provided to merely demonstrate the operability of the present invention. The selection of appropriate adsorbent components, feed gases and process conditions can be determined from the specification without departing from the spirit of the invention as herein disclosed and described. The scope of this invention includes equivalent embodiments, modifications, and variations that fall within the scope of the attached claims.

What is claimed is:

1. A multi-layered PSA adsorption system for purifying a gaseous feed containing less than about 5% $CO_2$ in a cyclic adsorption process, wherein said system comprises two or more adsorbent layers wherein the first layer comprises a water and/or water vapor removing adsorbent and the second layer comprises a $CO_2$ removing adsorbent, wherein said $CO_2$ removing adsorbent is a core-in-shell composite adsorbent comprising an inert dense core, and an adsorptive shell, wherein said adsorptive shell comprises at least one zeolite-containing $CO_2$ removal adsorbent and a binder, wherein the core to bead diameter ratio of said composite adsorbent ranges from about 50% to about 90% and wherein said binding agent comprises greater than about 10 wt % of the adsorptive shell material, wherein the attrition loss of said core-in-shell composite adsorbent is less than about 2 wt %, and wherein volumetric performance of said adsorbent is greater than or equal to 0.70 BSF (m3/s.m2).

2. The adsorption system of claim 1 wherein said binder is a clay selected from a group comprising attapulgite, sepiolite, kaolin, haloysite and mixtures thereof.

3. The adsorption system of claim 1 wherein the volumetric performance of core-in-shell adsorbent is greater than or equal to 0.76 BSF (m3/s.m2).

4. The adsorption system of claim 1 wherein the zeolite is type X and has a $SiO_2/Al_2O_3$ ratio of about less than or equal to 2.5.

5. The adsorption system of claim 1 wherein the first layer is activated alumina and the inert dense core in the core-in-shell adsorbent of the second layer is sand.

6. A cyclic adsorption process for removing at least water and $CO_2$ from a gaseous water and $CO_2$ containing feed stream comprising contacting the feed stream with the adsorption system of claim 1.

7. A core-in-shell composite adsorbent for use in purifying a process gas stream containing less than about 5% $CO_2$ in an adsorption process, said composite comprising an adsorptive shell on an inert dense core, wherein said adsorptive shell comprises a zeolite-containing $CO_2$ removal adsorbent and a clay binding agent wherein the clay binder constitutes greater than about 10 wt % of the adsorptive shell and the core to bead diameter ratio ranges from about 50% to about 90%, wherein the attrition loss of said core-in-shell composite adsorbent is less than about 2 wt %, and wherein volumetric performance of said adsorbent is greater than or equal to 0.70 BSF (m3/s.m2).

8. The adsorbent of claim 7 wherein the inert dense core is naturally occurring sand.

9. The adsorbent of claim 7 wherein the zeolite is type X and has a $SiO_2/Al_2O_3$ ratio of about 2.0.

10. A cyclic adsorption process for removing $CO_2$ from a gaseous feed stream containing at least water and $CO_2$ comprising contacting the feed stream with the adsorbent of claim 7 and recovering the $CO_2$ depleted stream.

11. The adsorbent of claim 7 used for removing $CO_2$ from air in a PSA adsorption process.

12. A cyclic gas adsorption process for removing at least $CO_2$ from a gas stream having less than 5% $CO_2$, the process comprising contacting the gas stream with a multilayer adsorption system comprising two or more adsorbent layers wherein the first adsorbent layer comprises at least a water and/or water vapor removing adsorbent and the second adsorbent layer comprises a core-in-shell composite adsorbent comprising at least a zeolite-containing $CO_2$ removal adsorbent shell on an inert dense core, wherein the core to bead diameter ratio ranges from about 50% to about 90%, wherein the attrition loss of said core-in-shell composite adsorbent is less than 2 wt %, wherein volumetric performance of said adsorbent is greater than or equal to 0.70 BSF (m3/s.m2), and recovering the $CO_2$ depleted gas stream.

13. The process of claim 12 wherein the $CO_2$ removal adsorbent also removes nitrogen oxides, hydrocarbons or both.

14. The process of claim 12 wherein the zeolite is type X and has a $SiO_2/Al_2O_3$ ratio of about less than or equal to 2.5.

15. The process of claim 12 wherein the zeolite is type X and has a $SiO_2/Al_2O_3$ ratio of about 2.0.

16. The process of claim 12 wherein the adsorption process is selected from PSA, TSA and VPSA processes.

17. The process of claim 12 wherein the process is a PSA prepurification process for the removal of at least water and $CO_2$ in air prior to a cryogenic air separation process.

18. The composite adsorbent of claim 7 wherein the core to bead diameter ratio ranges from about 60 to 80%.

* * * * *